(12) United States Patent
Sahu et al.

(10) Patent No.: US 12,214,948 B2
(45) Date of Patent: Feb. 4, 2025

(54) PANEL FOR A FLEXIBLE PACKAGE

(71) Applicant: Positive Packaging United (ME)FZCO, Dubai (AE)

(72) Inventors: Nrusingh Sahu, Dubai (AE); Rajan Thomas, Dubai (AE); Nitin Sankhe, Dubai (AE)

(73) Assignee: Positive Packaging United (ME) FZCO, Dubai (AE)

(*) Notice: Subject to any disclaimer, the term of this patent is extended or adjusted under 35 U.S.C. 154(b) by 779 days.

(21) Appl. No.: 17/421,804

(22) PCT Filed: Nov. 20, 2019

(86) PCT No.: PCT/IB2019/059966
§ 371 (c)(1),
(2) Date: Jul. 9, 2021

(87) PCT Pub. No.: WO2020/144507
PCT Pub. Date: Jul. 16, 2020

(65) Prior Publication Data
US 2022/0097942 A1    Mar. 31, 2022

(30) Foreign Application Priority Data
Jan. 10, 2019   (IN) .............................. 201921001227

(51) Int. Cl.
*B65D 75/56*   (2006.01)
*B31B 70/86*   (2017.01)
(Continued)

(52) U.S. Cl.
CPC .......... *B65D 75/563* (2013.01); *B31B 70/872* (2017.08); *B31B 70/874* (2017.08);
(Continued)

(58) Field of Classification Search
None
See application file for complete search history.

(56) References Cited

U.S. PATENT DOCUMENTS 3,850,724 A * 11/1974 Lehmacher ........... B29C 69/006
                                                    156/518
8,414,188 B2 * 4/2013 Koesters ................ B65D 75/56
                                                    383/906
(Continued)

FOREIGN PATENT DOCUMENTS

EP    2301859 A1    3/2011
EP    2301859 B1    3/2011
(Continued)

OTHER PUBLICATIONS

ISA/AT, "International Search Report for PCT Application No. PCT/IB2019/059966", Austria, Apr. 15, 2020.

*Primary Examiner* — Tanzim Imam
(74) *Attorney, Agent, or Firm* — Troutman Pepper Locke; Tim Tingkang Xia, Esq.

(57) ABSTRACT

A panel for a flexible package (100), and a method and system for forming the panel is provided. The panel comprises a first laminate having an open-area; a second laminate extending from a top edge to a bottom edge; and a third laminate, the third laminate sealed with the first laminate to cover the open-area, and the top edge and the bottom edge of the second laminate sealed between the first laminate and the third laminate such that area between the top edge and the bottom edge of the second laminate remains free forming a loop with the panel. The panel preferably forms a side-gusset (102) of a flexible packaging pouch, wherein the loop can be used as a handle (110) to carry the flexible package.

8 Claims, 3 Drawing Sheets

(51) Int. Cl.
  *B32B 37/02* (2006.01)
  *B32B 37/06* (2006.01)
  *B32B 38/00* (2006.01)
  *B31B 155/00* (2017.01)
  *B31B 160/20* (2017.01)
  *B31B 170/20* (2017.01)

(52) U.S. Cl.
  CPC ............ *B31B 70/876* (2017.08); *B32B 37/02* (2013.01); *B32B 37/06* (2013.01); *B32B 38/0004* (2013.01); *B31B 2155/00* (2017.08); *B31B 2160/20* (2017.08); *B31B 2170/20* (2017.08); *B32B 2310/0843* (2013.01); *B32B 2439/46* (2013.01)

(56) References Cited

U.S. PATENT DOCUMENTS

| | | | | |
|---|---|---|---|---|
| 8,844,246 B2 * | 9/2014 | Perick | ................ | B65D 75/566 |
| | | | | 53/413 |
| 9,315,311 B2 * | 4/2016 | Hutchison | .......... | B65D 75/5883 |
| 9,624,017 B2 * | 4/2017 | Kruse | .................... | B65D 33/06 |
| 9,938,046 B2 * | 4/2018 | Kujat | .................... | B65D 33/20 |
| 2009/0202181 A1 * | 8/2009 | Alaux | .................... | B65D 33/08 |
| | | | | 383/7 |
| 2009/0277916 A1 * | 11/2009 | Steele | .................. | B65D 75/566 |
| | | | | 220/754 |
| 2011/0280501 A1 * | 11/2011 | Brauer | ................ | B65D 75/008 |
| | | | | 383/26 |
| 2011/0305407 A1 * | 12/2011 | Gum | ...................... | B65D 33/10 |
| | | | | 493/266 |
| 2012/0207408 A1 * | 8/2012 | Moehlenbrock | ... | B65D 77/2032 |
| | | | | 383/42 |
| 2014/0112599 A1 * | 4/2014 | Martin | .................. | B65D 33/10 |
| | | | | 383/7 |
| 2015/0049965 A1 * | 2/2015 | Gum | ...................... | B65D 33/02 |
| | | | | 493/189 |
| 2015/0126349 A1 | 5/2015 | Ishihara et al. | | |
| 2016/0075481 A1 * | 3/2016 | Koesters | ................ | B65D 33/06 |
| | | | | 493/244 |
| 2017/0129677 A1 * | 5/2017 | Chaturvedi | ............ | B65D 31/10 |

FOREIGN PATENT DOCUMENTS

EP    3037360 A1 *  6/2016  ............ B65D 33/06
WO    2017075202 A1  5/2017

* cited by examiner

PANEL FOR A FLEXIBLE PACKAGE

FIELD OF THE INVENTION

The invention relates to a panel for a flexible package, and a method and system for forming the panel.

BACKGROUND OF THE INVENTION

Flexible packaging solutions find application in beverage, food, consumer packaged goods, personal care products, etc., and with rising consumer needs and requirements, flexible packaging solutions continue to evolve.

Packaging in various shapes and sizes are widely available. It is well known that small-sized flexible packaging's are easy to carry whereas the large-sized packaging's are difficult to carry. It is hence desirable that such large-sized packaging provide some means such as a handle for lifting/carrying the package. One type of packaging with a handle feature comprises a string provided at top of the packaging, whereby a series of holes formed on the package and the string is passed through the holes to form a handle. Another type of packaging with a handle feature is forming an opening in the package towards the top, whereby the opening can be used as a handle. Since the above options are provided at the top of the package, the entire load of product filled inside the package is centered on these handles when the pack is lifted during handling. This is not very ergonomic and leads to the consumer/handler facing higher load. Further, large-sized packaging's are vertical packs, and hence have a greater height when compared to its width. This adds to the problem of lifting/carrying the package as the package has to be lifted further away from the ground so that they don't touch the ground. This means higher lifting effort for the consumer. The handles are thus often deformed, and in some cases break off or even tear the packaging. Further, handle on the top do not help in easy dispensing of the filled products, in that, the handle area needs to be cut completely before product inside the package can be dispensed, accessed.

It is thus desirable to address at-least the aforementioned problems associated with large-sized or bulky or heavy-weight packaging.

SUMMARY OF THE INVENTION

In one aspect, the present invention provides a panel, comprising a first laminate having an open-area; a second laminate extending from a top edge to a bottom edge; and a third laminate, the third laminate sealed with the first laminate to cover the open-area, and the top edge and the bottom edge of the second laminate sealed between the first laminate and the third laminate such that area between the top edge and the bottom edge of the second laminate remains free forming a loop with the panel.

In another aspect, the present invention provides a flexible packaging, wherein one of the panels of the flexible packaging is formed with the panel discussed hereinabove.

In another aspect, the present invention provides a method for forming a panel for a flexible package, the method comprising the steps of providing a first laminate from an unwinder of a first supply station, the first laminate having an inner face and an outer-face; forming an open-area on the first laminate at a first cutting station; providing a second laminate from an unwinder of a second supply station, the second laminate having opposing top and bottom edges and opposing side edges; sealing at at-least a first sealing station all edges of the second laminate around the open-area from the inner face of the first laminate to cover/close the open-area; forming spaced apart slits in between the opposing side edges of the second laminate at a second cutting station causing area of the second laminate between the spaced apart slits to remain free as the second laminate remains sealed at the opposing top and bottom edges forming a loop with outer-face of the first laminate; providing a third laminate from an unwinder of a third supply station; and sealing at a second sealing station a third laminate around the open-area from the inner face of the first laminate, whereby the top and bottom edges of the second laminate is sandwiched between the first laminate and the third laminate.

In another aspect, the present invention provides a system for forming a panel for a flexible package, the system comprising a first supply station for providing a first laminate having an inner face and an outer-face; a first cutting station for forming an open-area on the first laminate; a second supply station for providing a second laminate having opposing top and bottom edges and opposing side edges; a first sealing station for sealing the second laminate to the inner face of the first laminate to cover/close the open-area; a second cutting station for forming spaced apart slits in between the opposing side edges of the second laminate causing area of the second laminate between the spaced apart slits to remain free as the second laminate remains sealed at the opposing top and bottom edges forming a loop with outer-face of the first laminate; a third supply station for providing a third laminate; and a second sealing station for sealing the third laminate to the inner-face of the first laminate, whereby the top and bottom edges of the second laminate is sandwiched between the first laminate and the third laminate.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention is directed towards a panel for a flexible package, wherein the panel has a loop which can be used as a handle to carry the flexible package.

Figure 1:
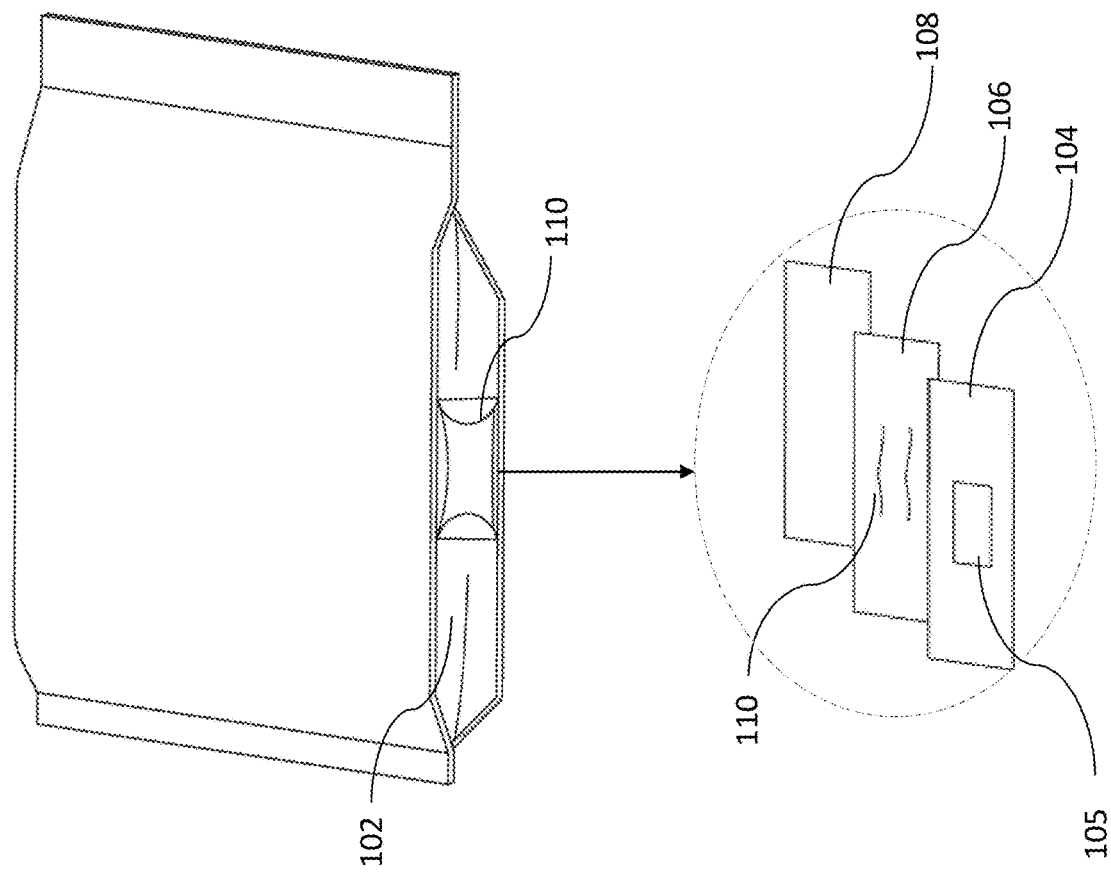
FIG. 1 shows a flexible package in accordance with an embodiment of the invention.

FIG. 1 shows a flexible package 100 in accordance with an embodiment of the invention. As shown, the flexible package is a gusset pack, and a handle 110 is formed on a side gusset 102. The handle is formed or adapted to the gusset prior to forming the gusset pack. In this regard, a panel which constitutes a side-panel is formed. The panel comprises a first laminate 104, a second laminate 106 and a third laminate 108. The first laminate has an open-area 105, and the third laminate is sealed with the first laminate to cover the open-area. The second laminate extends from a top edge to a bottom edge, the top edge and the bottom edge are sealed between the first laminate and the third laminate such that area between the first and the second end of the second laminate remains free forming a loop with the panel. Accordingly, when the panel is adapted to form a package shown in FIG. 1, the loop can be used as a handle or grip to carry the flexible package. As shown in the figure, the loop is provided along the center of the side-gusset. Accordingly, since the weight of the package is distributed across the larger length of the package, the loop or the handle makes it easy for the package to be carried. Also, providing the handle on the side provides ease of carrying and handling the package during use.

The first laminate is a multi-layer laminate. The first laminate can be prepared using various possible combinations of papers and/or films such as polyethylene terepthalate, biaxially oriented polypropylene, nylon etc, and barrier films such as metallised polyethylene terepthalate, metallised biaxially oriented polypropylene, metallised cast polypropylene, nylon, aluminum foils, etc and sealant layers made from the polyolefins family such as Polyethylene films, polypropylene films etc. The first laminate will typically comprise of a print layer and at-least one sealant layer. For example, first laminate can be a combination of polyethylene terepthalate and polyethylene (PET/PE); or polyethylene terepthalate, nylon and polyethylene (PET/Nylon/PE); or polyethylene terepthalate, metallised polyethylene terepthalate and polyethylene laminate (PET/METPET/PE); or biaxially oriented polypropylene, polyethylene (BOPP/PE); or biaxially oriented polypropylene, nylon or polyethylene (BOPP/Nylon/PE). All such laminate combinations can also be made using polypropylene film as a sealant layer in place of polyethylene films. These are some examples of flexible laminates, however all possible laminate combinations are within the scope of this invention. The first laminate can be with or without printing.

The second laminate is a multi-layer laminate. The second laminate can be prepared using various possible combinations of papers and/or films such as polyethylene terepthalate, biaxially oriented polypropylene, nylon etc, and barrier films such as metallised polyethylene terepthalate, metallised biaxially oriented polypropylene, metallised cast polypropylene, nylon, aluminum foils, etc and sealant layers made from the polyolefins family such as polyethylene films, polypropylene films etc. The second laminate typically comprises of a print layer and at-least one sealant layer. For example, second laminate can be a combination of polyethylene terepthalate and polyethylene (PET/PE); or polyethylene terepthalate, nylon and polyethylene (PET/Nylon/PE); or polyethylene terepthalate, metallised polyethylene terepthalate and polyethylene laminate (PET/METPET/PE); or biaxially oriented polypropylene and polyethylene (BOPP/PE); or biaxially oriented polypropylene, nylon and polyethylene (BOPP/Nylon/PE). All such laminate combinations can also be made using polypropylene film as a sealant layer in place of polyethylene films. The second laminate has a Polyethylene or polypropylene or such sealant films layer on at-least one outer face. In another embodiment of the invention the second laminate can also be only a ployethylene or polypropylene film with or without barrier. The second laminate can be with or without printing.

The third laminate is a multi-layer laminate. The third laminate can be prepared using various possible combinations of papers and/or films such as polyethylene terepthalate, biaxially oriented polypropylene, nylon etc, and barrier films such as metallised polyethylene terepthalate, metallised biaxially oriented polypropylene, metallised cast polypropylene, nylon, aluminum foils, etc and sealant layers made from the polyolefins family such as polyethylene films, polypropylene films etc. The third laminate typically comprises of a print layer and at-least one sealant layer. For example, third laminate can be a combination of polyethylene terepthalate and polyethylene (PET/PE); polyethylene terepthalate, nylon, and polyethylene laminate (PET/Nylon/PE); or polyethylene terepthalate, metallised polyethylene terepthalate, and polyethylene laminate (PET/METPET/PE); or biaxially oriented polypropylene, and polyethylene (BOPP/PE); or biaxially oriented polypropylene, nylon, and polyethylene (BOPP/Nylon/PE). All such laminate combinations can also be made using polypropylene film as a sealant layer in place of polyethylene films. In another embodiment of the invention the third laminate can also be only a ployethylene or polypropylene film with or without barrier. The third laminate can be with or without printing.

Figure 2:
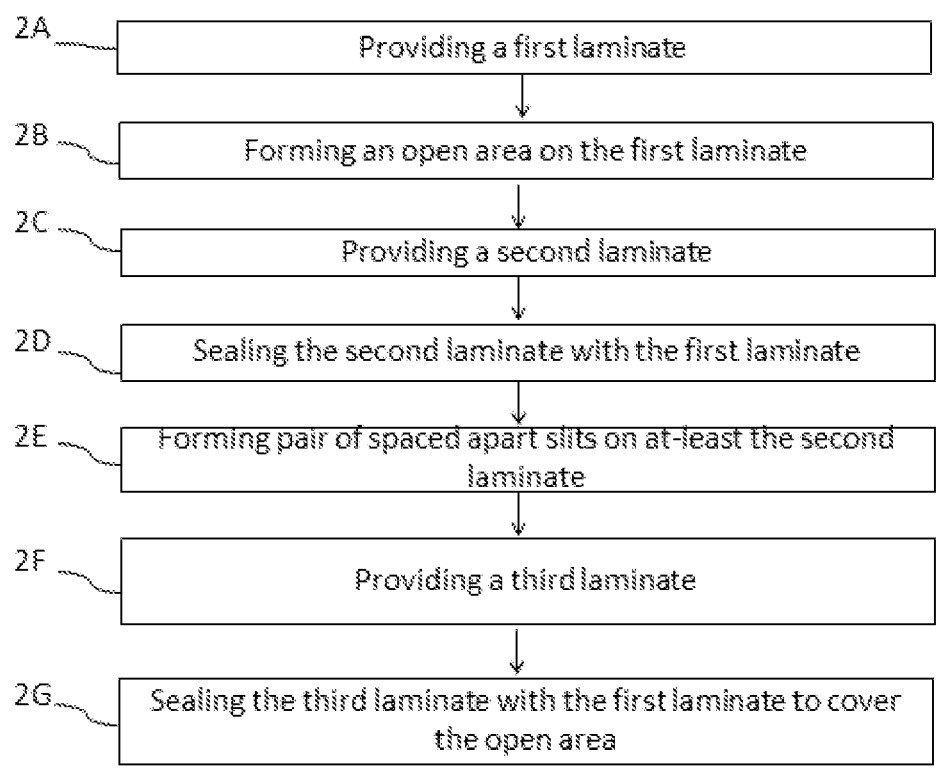
FIG. 2 shows a flow diagram of a method for forming a panel for a flexible package in accordance with an embodiment of the invention.
Figure 3:
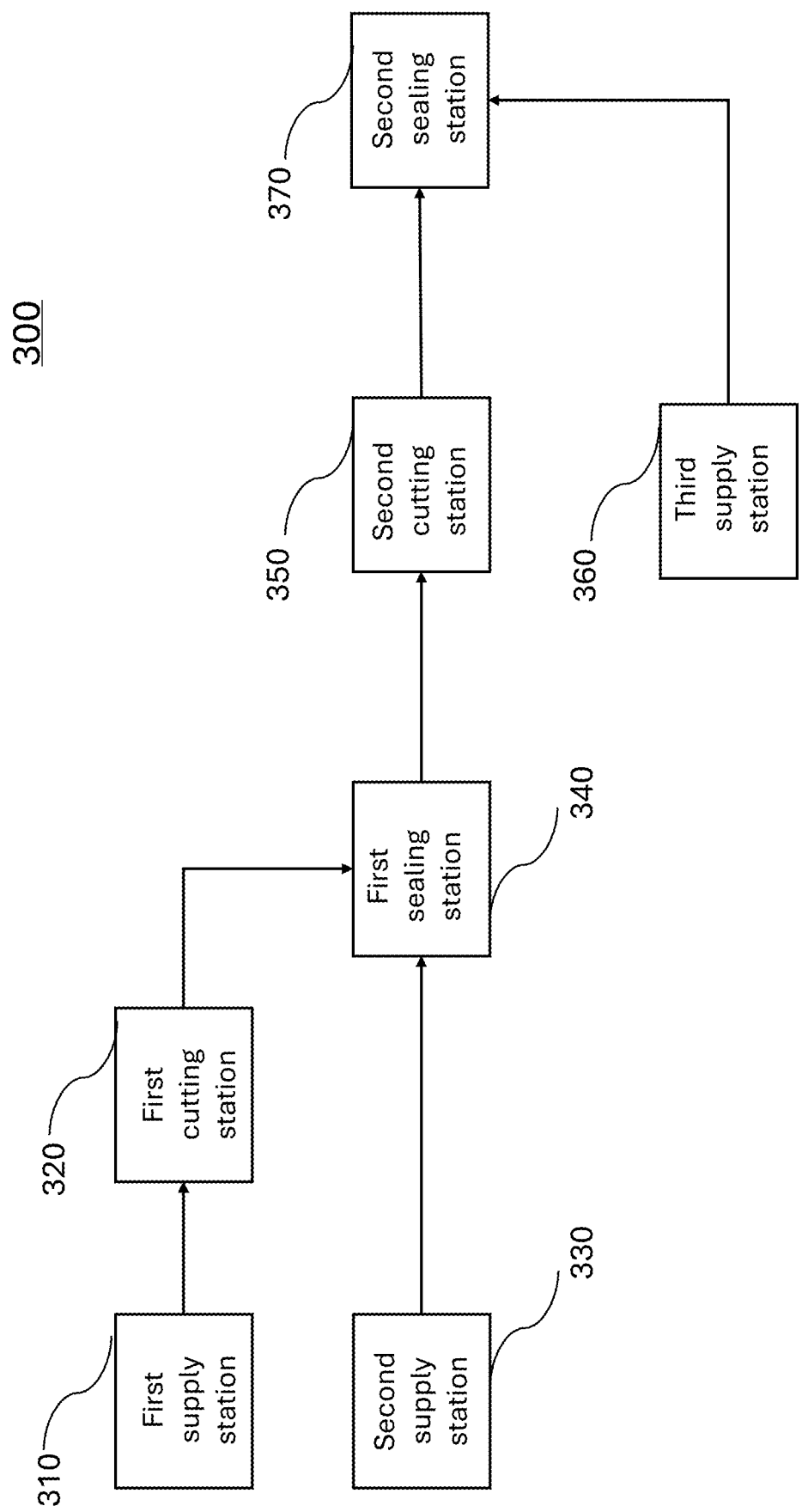
FIG. 3 shows a diagram of a system for forming a panel for a flexible package in accordance with an embodiment of the invention.

FIG. 2 shows a method for forming a panel for a flexible package. The method is carried out on a system 300, as shown in FIG. 3, comprising at-least a first supply station 310 for providing a first laminate, a second supply station 330 for providing a second laminate, a third supply station 360 for providing a third laminate, a first cutting station 320, a second cutting station 350, a first sealing station 340 and a second sealing station 370. The first laminate from the first supply station 310 is carried via conveyor across the other stations of the system. Further, the system includes electronically or mechanically controlled drives for each of the stages/stations The method starts at step 2A where the first laminate is provided from the first supply station 310. The first laminate has an inner face and an outer face. The first supply station 310 comprises an unwinder from which the first laminate is unwound and carried via conveyor across the system where further steps are carried out. The first laminate is as per pre-determined dimensions such that the first laminate can be used eventually to form a panel or a side-wall of a flexible packaging. Thereafter, the method proceeds to step 2B whereby an open area is formed on the first laminate. The open area is substantially rectangular, and is preferably provided along the center of the first laminate. The open area can be formed on a pre-defined area of the first laminate. The open area alternately can be formed at the first supply station 310 or the first cutting station 320 provided downstream of the first supply station 310. The first supply station 310 or the first cutting station 320 comprises of a mechanical punch or a laser scoring apparatus where the area open area can be formed by cutting or punching or by laser scoring or any other cutting and creasing techniques. The first laminate is a multi-layer laminate. The first laminate can be prepared using various possible combinations of papers and/or films such as polyethylene terepthalate, biaxially oriented polypropylene, nylon etc., and barrier films such as metallised polyethylene terepthalate, metallised biaxially oriented polypropylene, metallised cast polypropylene, nylon, aluminum foils, etc. and sealant layers made from the polyolefins family such as polyethylene films, polypropylene films etc. The first laminate will typically comprise of a print layer and at-least one sealant layer. For example, first laminate can be a combination of polyethylene terepthalate and polyethylene (PET/PE); or polyethylene terepthalate, nylon and polyethylene (PET/Nylon/PE); or polyethylene terepthalate, metallised polyethylene terepthalate and polyethylene laminate (PET/METPET/PE); or biaxially oriented polypropylene, polyethylene (BOPP/PE); and biaxially oriented polypropylene, nylon or polyethylene (BOPP/Nylon/PE). All such laminate combinations can also be made using polypropylene film as a sealant layer in place of polyethylene films. These are some examples of flexible laminates, however all possible laminate combinations are within the scope of this invention.

At step 2C, the second laminate is provided from the second supply station. The second supply station comprises an unwinder from which the second laminate is first unwound and cut into the required size. After cutting, the second laminate is aligned with the open area formed on the first laminate. The second laminate has opposing top and bottom edges and opposing side edges, and has an area greater than the open area of the first laminate. Once the second laminate is carried and aligned over the open-area of the first laminate, the second laminate is sealed with the first laminate at step 2D at the first sealing station. The second laminate is sealed with the inner face of the first laminate along the opposing top and bottom edges and opposing side edges. Thus, the second laminate is sealed around the open area of the first laminate from all sides/edges. The first sealing station comprises at-least one heat seal bar aligned around periphery of the open area so as to seal the second laminate around the open-area of the first laminate. The heat seal bar is positioned above and/or below the laminates, and when operated press against each other with the laminates therebetween to seal the laminates. The sealing can also be achieved by ultrasonic sealing, impulse sealing, etc. In an embodiment, the second laminate is sealed with the first laminate in multiple steps/stages. Preferably, the laminate is sealed in three stages—a first stage, a second stage and a third stage whereby the seal bar is operated sequentially. At the first stage, the heat seal bar is operated to seal the second laminate with the opposing top and bottom edges of the open area of the first laminate holding the second laminate in position with the first laminate. The seal bar has a semi-circular or rectangular profile. In an embodiment, the heat seal bar has a semi-circular profile, and the sealing is performed in a semi-circular shape along the opposing top and bottom edges. The sealing in semi-circular enhances the structural strength of the second laminate sealed with the first laminate. At the second stage, the seal bar is operated to seal the opposing side edges of the second laminate around the open area. Thereafter, at the third stage, the sealing of the second laminate with the first laminate is further reinforced by operating the seal bar simultaneously to reseal the second laminate along all edges concurrently/simultaneously. The seal thus formed has good structural strength. The second laminate can be sealed with the outer face or inner face of the first laminate. The second laminate is a multi-layer laminate. The second laminate can be prepared using various possible combinations of papers and/or films such as polyethylene terepthalate, biaxially oriented polypropylene, nylon etc, and barrier films such as metallised polyethylene terepthalate, metallised biaxially oriented polypropylene, metallised cast polypropylene, nylon, aluminum foils, etc and sealant layers made from the polyolefins family such as polyethylene films, polypropylene films etc. The second laminate typically comprises of a print layer and at-least one sealant layer. For example, second laminate can be a combination of polyethylene terepthalate and polyethylene (PET/PE); or polyethylene terepthalate, nylon and polyethylene (PET/Nylon/PE); or polyethylene terepthalate, metallised polyethylene terepthalate and polyethylene laminate (PET/METPET/PE); or biaxially oriented polypropylene and polyethylene (BOPP/PE); biaxially oriented polypropylene, nylon and polyethylene (BOPP/Nylon/PE). All such laminate combinations can also be made using polypropylene film as a sealant layer in place of polyethylene films. The second laminate has a Polyethylene or polypropylene or such sealant films layer on at-least one outer face. In another embodiment of the invention the second laminate can also be only a ployethylene or polypropylene film with or without barrier. The second laminate can be with or without printing.

Thereafter, the method proceeds to step 2E, whereby a pair of spaced apart slits are formed on at-least the second laminate which is sealed with the first laminate. The slits are formed at the second cutting station which is provided after the first sealing station whereby slits can be formed by a mechanical punch or a laser scoring apparatus. The slits are formed parallel and in between the opposing side edges of the second laminate. The slits cause the area between the top edge and the bottom edge of the second laminate to remain free forming a loop with the first laminate. The loop provides functionality of a handle or a grip.

The second laminate however remains sealed with the first laminate along the opposing top and bottom edges. Thus, while the first laminate is sealed with the second laminate, the slits form open spaces. At step 2F, a third laminate is provided to cover the open spaces. The third laminate is provided from the third supply station. The third supply station comprises an unwinder from which the third laminate is first unwound and cut into the required size. Thereafter the third laminate is carried and aligned over the open-area. The third laminate has an area greater than the open area so as to cover the open area around its periphery and/or open spaces formed by the slits. The third laminate is sealed at step 2G with the inner face around the open-area of the first laminate along the opposing side edges and opposing top and bottom edges, thereby also sealing the second laminate i.e. each opposing top and bottom edges of the second laminate is sandwiched between the first laminate and the third laminate. The sealing is performed at the second sealing station. The second sealing station comprises of at-least one heat seal bar aligned around periphery of the open area so as to seal the third laminate around the open-area of the first laminate. The heat seal bar is positioned above and/or below the laminates i.e. second laminate/first laminate combination and the third laminate, to seal the third laminate to the first laminate. Depending upon the requirement there may be more heat seal bars to achieve the desired functional result. The sealing can also be achieved by ultrasonic sealing, impulse seal etc. The seal bar has a semi-circular or rectangular profile. The third laminate is a multi-layer laminate. The third laminate can be prepared using various possible combinations of papers and/or films such as polyethylene terepthalate, biaxially oriented polypropylene, nylon etc, and barrier films such as metallised polyethylene terepthalate, metallised biaxially oriented polypropylene, metallised cast polypropylene, nylon, aluminum foils, etc and sealant layers made from the polyolefins family such as polyethylene films, polypropylene films etc. The third laminate typically comprises of a print layer and at-least one sealant layer. For example, third laminate can be a combination of polyethylene terepthalate and polyethylene (PET/PE); polyethylene terepthalate, nylon, and polyethylene laminate (PET/Nylon/PE); or polyethylene terepthalate, metallised polyethylene terepthalate, and polyethylene laminate (PET/METPET/PE); or biaxially oriented polypropylene, and polyethylene (BOPP/PE); or biaxially oriented polypropylene, nylon, and polyethylene (BOPP/Nylon/PE). All such laminate combinations can also be made using polypropylene film as a sealant layer in place of polyethylene films. In another embodiment of the invention the third laminate can also be only a ployethylene or polypropylene film with or without barrier. The third laminate can be with or without printing. Further, as discussed hereinbefore, the first laminate with the third laminate and the looped second laminate is thereafter used to form a side-gusset of a flexible packaging pouch or a gusset pack as shown in FIG. 1, whereby the loop can be used as a handle or grip to carry the flexible package. The structural rigidity of the loop enables heavy loads to be carried within the flexible package without the loop deforming or tearing off.

Advantageously, the present invention provides a handle for a gusset pack which is formed along a side-wall or a side gusset of a flexible package. The present invention thus obviates the disadvantages of handles provided on top of large size packages. Also, the handle formed of the instant invention is structurally strong and provides higher load bearing capacity.

While the present invention has been described with respect to certain embodiments, it will be apparent to those skilled in the art that various changes and modification may be made without departing from the scope of the invention as defined in the following claims.

The invention claimed is:

1. A method for forming a panel for a flexible package, the method comprising the steps of:
   providing a first laminate from an unwinder of a first supply station, the first laminate having an inner face and an outer face;
   forming an open area on the first laminate at a first cutting station;
   providing a second laminate from an unwinder of a second supply station, the second laminate having opposing top and bottom edges and opposing side edges;
   sealing at at least a first sealing station the second laminate to the inner face of the first laminate around the open area to cover/close the open area;
   forming spaced apart slits in between the opposing side edges of the second laminate at a second cutting station to cause an area of the second laminate between the spaced apart slits to remain free as the second laminate remains sealed at the opposing top and bottom edges and to form a loop with the outer face of the first laminate;
   providing a third laminate from an unwinder of a third supply station; and
   sealing at a second sealing station the third laminate to the inner face of the first laminate around the open area, whereby the top and bottom edges of the second laminate are sandwiched between the first laminate and the third laminate.

2. The method as claimed in claim 1, wherein sealing the second laminate around the open area of the first laminate comprises the steps of:
   sealing the opposing top and bottom edges of the second laminate around the open area of the first laminate;
   sealing the opposing side edges of the second laminate around the open area of the first laminate; and
   resealing the second laminate along all of its edges concurrently/simultaneously.

3. The method as claimed in claim 1, wherein the seal formed on the opposing top and bottom edges is in a semi-circular shape.

4. A system for forming a panel for a flexible package, the system comprising:
   a first supply station for providing a first laminate having an inner face and an outer face;
   a first cutting station for forming an open area on the first laminate;
   a second supply station for providing a second laminate having opposing top and bottom edges and opposing side edges;
   a first sealing station for sealing the second laminate to the inner face of the first laminate to cover/close the open area;
   a second cutting station for forming spaced apart slits in between the opposing side edges of the second laminate to cause an area of the second laminate between the spaced apart slits to remain free as the second laminate remains sealed at the opposing top and bottom edges and to form a loop with the outer face of the first laminate;
   a third supply station for providing a third laminate; and
   a second sealing station for sealing the third laminate to the inner face of the first laminate, whereby the top and bottom edges of the second laminate are sandwiched between the first laminate and the third laminate.

5. The system as claimed in claim 4, wherein the first sealing station is configured to:
   seal the opposing top and bottom edges of the second laminate around the open area of the first laminate;
   seal the opposing side edges of the second laminate around the open area of the first laminate; and
   reseal the second laminate along all of its edges concurrently/simultaneously.

6. The system as claimed in claim 4, wherein each sealing station comprises at least one heat seal bar aligned around a periphery of the open area so as to cover the open area around its periphery with the second laminate and/or the third laminate.

7. The system as claimed in claim 6, wherein the at least one heat seal bar has a semi-circular or rectangular profile.

8. The system as claimed in claim 4, wherein each cutting station comprises a mechanical punch or a laser scoring apparatus.

* * * * *